United States Patent Office 3,376,845
Patented Apr. 9, 1968

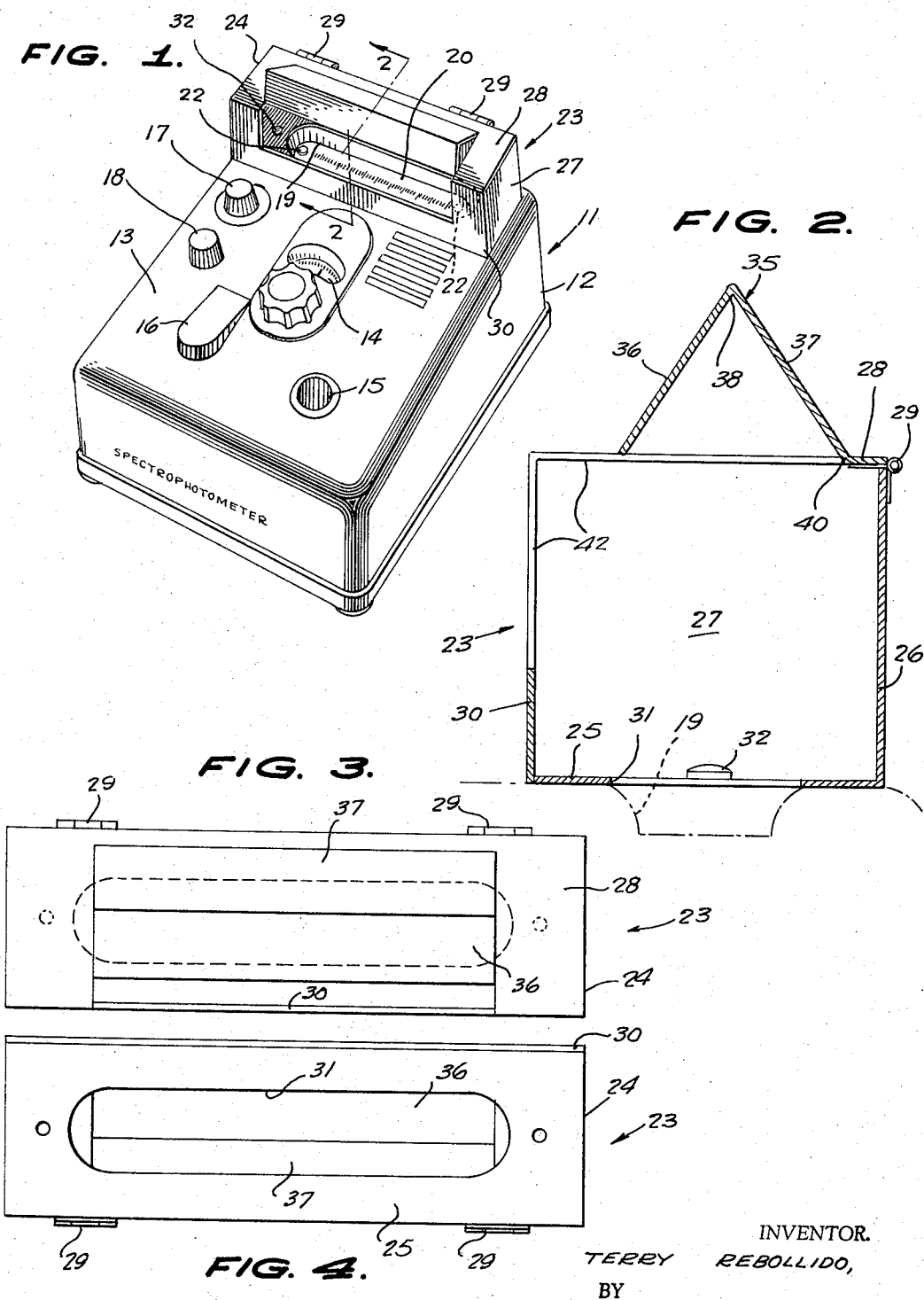

3,376,845
ANTI-GLARE SHIELD FOR A
SPECTROPHOTOMETER
Terry Rebollido, Hayward, Calif. (379 Monte Carlo Ave.
VII Hills, Union City, Calif. 94587)
Filed Mar. 1, 1966, Ser. No. 530,901
6 Claims. (Cl. 116—114)

This invention relates to spectrophotometers, and more particularly to improvements in glare shields for use adjacent to the galvanometer scales of spectrophotometers.

The main object of the invention is to provide a novel and improved device for eliminating glare and for improving the ease of reading of the galvanometer scale of a spectrophotometer, the device being simple in construction, being easy to install on a spectrophotometer, and being arranged so that it may be adjusted to a non-obstructing position when access is required to the associated photometer scale, for example, for changing the scale or for replacing same.

A further object of the invention is to provide an improved glare shield attachment for use with a spectrophotometer scale, the attachment being inexpensive to manufacture, being durable in construction, being relatively compact in size, being adjustable to provide a desired amount of exposure of the associated photometer galvanometer scale, and being adjustable, at times, to an out-of-the-way position to provide easy access to the interior portion thereof.

A still further object of the invention is to provide an improved light shield for use with the galvanometer scale of a spectrophotometer, the light shield being arranged to be mounted directly over the gavlanometer scale with which it is to be employed and being provided with means for adjusting the size of the viewing opening defined thereby for reading the galvanometer scale, the desired adjustments being performed manually and without requiring the use of any tools or implements.

Further objects and advantages of the invention will become apparent from the following description and claims, and from the accompanying drawing, wherein:

FIGURE 1 is a perspective view of a spectrophotometer provided with an improved light shield device constructed in accordance with the present invention.

FIGURE 2 is an enlarged vertical cross-sectional view taken transversely through the light shield device shown in FIGURE 1 substantially on the line 2—2 of FIGURE 1.

FIGURE 3 is an enlarged top plan view of the light shield device shown in FIGURE 1.

FIGURE 4 is an enlarged bottom plan view of the light shield attachment shown in FIGURES 1 and 2.

Referring to the drawings, 11 designates a conventional spectrophotometer, for example, a spectrophotometer such as Coleman 6A manufactured by Coleman Instruments Corporation, 42 Madison St., Maywood, Ill. The spectrophotometer 11 is of standard construction and includes a housing 12 having a top wall 13 which serves as a control panel, said top wall having mounted thereon a wave-length-indicating dial 14, a cuvette well 15, a galvanometer lever housing 16 containing a galvanometer adjusting lever, the galvanometer coarse-adjusting knob 17, the galvanometer fine-adjusting knob 18, and an elongated galvanometer scale-receiving recess 19 in which is detachably-mounted a transparent galvanometer scale 20, the scale being, for example, similar to the galvanometer scale panel type 6–401 manufactured by Coleman Instruments Corporation, as above-mentioned. The scale panel 20 is provided with end slots enabling the panel to be lockingly-engaged with headed pins 22, 22 provided in the well or recess 19.

Designated generally at 23 is an improved light shield device constructed in accordance with the present invention for facilitating reading of the scale panel 20 and for eliminating difficulties from glare caused by overhead lighting or strong window light in the area in which the spectrophotometer 11 is used. The glare-shield device 23 comprises an elongated boxlike housing 24 consisting of a generally rectangular bottom wall 25, a vertical rear wall 26 rising from the rear edge of bottom wall 25, transverse end walls 27 mutually perpendicular to bottom wall 25 and rear wall 26, a generally rectangular top wall 28 hinged to the top edge of rear wall 26, as by a pair of hinges 29, 29, and a depending front wall 30 perpendicular to the top wall 28. The front wall 30 and top wall 28 are substantially rigidly united and are swingable as a unit around the axis of the hinges 29, 29, so that, at times, said front wall 30 and top wall 28 may be swung rearwardly to a non-obstructing position with respect to the interior of the glare-shield housing 24.

The bottom wall 25 is provided with an elongated longitudinally-extending slot 31 which is substantially registrable with the galvanometer-scale recess 19 to overlie same and to substantially completely expose the galvanometer-scale panel 20. Bottom wall 25 may be secured to the top wall 13 of the spectrophotometer by respective fastening screws 32 located outwardly-adjacent the ends of the slot 31, as shown in FIGURE 1, the fastening screws 32 being threadedly-engaged in the top wall 13 of the spectrophotometer 12. Access to the screws 32 is readily obtainable for securing the bottom wall 25 to the spectrophotometer top wall 13 by rotating the housing top wall 28 and front wall 30 to the aforesaid rearwardly-swung out-of-the-way position.

The rigidly-connected top wall 28 and front wall 30 are formed with a longitudinally-hinged flap 35 comprising the respective forward and rear segments 36 and 37 having the corner fold 38. The segment 37 comprises a substantial portion of the forward part of top wall 28 and the flap segment 36 comprises a substantial portion of the upper part of the front wall 30. The flap 35 is integrally-joined at 40 to the rear marginal portion of top wall 28 and is bendable upwardly at the hinged joint 40 in the manner illustrated in FIGURES 1 and 2. The side edges of the flap 35 are frictionally-engageable with the side edges 42 of the aperture defined by the flap when it is elevated, so that the flap may be frictionally-locked in any desired position of adjustment, exposing the scale panel 20 to forward view. Preferably, the slits forming the side edges of the flap 35 are slightly divergent forwardly to insure substantial frictional binding between the side edges of the flap and the side-edge portions 42 of the slit, whereby the flap may be frictionally-locked in a desired position of adjustment over the galvanometer-scale recess 19. Thus, the opposite end portions of the flap are supportingly-engageable with the adjacent portions of the box-like member 24 to hold the flap in a desired elevated adjusted position.

As above-mentioned, complete access to the interior of housing 24 is obtainable by swinging the integrally-connected front wall 30 and top wall 28 to a rearward non-obstructing position. Thus, free access is provided not only for fastening the attachment to the top wall 13 of the spectrophotometer by means of the screws 32, but also, whenever it is desired to change or replace the galvanometer-scale panel 20, free access to the recess 19 is afforded when the top wall 28 and front wall 30 are swung to the aforesaid rearwardly-rotated position.

The attachment 23 may be made of any desired material, such as corrugated cardboard, molded plastic material, sheet metal, or the like. These materials are relatively-stiff, but have sufficient inherent flexibility to allow the integrally-hinged flap 35 to be elevated to an adjusted open position, such as that illustrated in FIGURES 1 and 2.

While a specific embodiment of an improved glare-shield attachment for a spectrophotometer has been disclosed in the foregoing description, it will be understood that various modifications within the spirit of the invention may occur to those skilled in the art. Therefore, it is intended that no limitations be placed on the invention except as defined by the scope of the appended claims.

What is claimed is:

1. In combination, a spectrophotometer having a top wall and having an elogated galvanometer scale located on said top wall, and a glare shield mounted on said top wall over said scale, said glare shield comprising an elongated box-like member mounted over and extending parallel to said galvanometer scale, said box-like member being provided with longitudinal vertical front and rear walls, a top wall, and transverse end walls and with a longitudinally-hinged flap including the forward portion of the top wall of the box-like member and an adjacent depending portion of its front longitudinal wall, said flap overlying the galvanometer scale and being movable to an elevated position exposing the galvanometer scale to view from a location in front of the spectrophotometer, the opposite side portions of the flap being supporting-engageable with the adjacent portions of the box-like member to hold the flap in said elevated position.

2. The structural combination of claim 1, wherein said top wall of the box-like member and said longitudinal front wall are rigidly-connected together and wherein said top wall is hingedly-connected to the rear longitudinal wall of the box-like member so that said top wall of the box-like member and longitudinal front wall may be at times swung as a unit rearwardly to an open position completely exposing the area around the galvanometer scale.

3. The structural combination of claim 2, and wherein said box-like member is formed of relatively-stiff sheet material and said flap is integral with but is bendable upwardly relative to said box-like member, thereby defining an observation opening for viewing the galvanometer scale.

4. The structural combination of claim 3, and wherein the material of said flap is sufficiently flexible so that the forward longitudinal portion of the flap may be flexed relative to the rear longitudinal portion thereof to vary the effective size of said observation opening.

5. The structural combination of claim 4, and wherein the flap is wedgingly-engageable at its side edges in said observation opening to frictionally-lock the flap in said elevated position.

6. The structural combination of claim 1, and wherein said box-like member is provided with a bottom wall, said bottom wall being formed with a longitudinal slot substantially registering with and exposing said galvanometer scale.

References Cited

UNITED STATES PATENTS 2,559,224  7/1951  Quidor _____ 240—2.1

NORTON ANSHER, *Primary Examiner.*

C. E. SMITH, *Assistant Examiner.*